United States Patent
Velammal et al.

(10) Patent No.: US 12,450,044 B2
(45) Date of Patent: Oct. 21, 2025

(54) SYSTEM AND METHOD FOR TRANSFORMING .NET FRAMEWORK BASED APPLICATIONS TO MODERN FRAMEWORKS

(71) Applicant: Cognizant Technology Solutions India Pvt. Ltd., Chennai (IN)

(72) Inventors: Parasu Pillai Iyappan Velammal, Chennai (IN); Kumaresan Ramachandran, Chennai (IN); Karthikeyan Mohan, Chennai (IN); Madhusudhan Venkatesan, Chennai (IN); Jeyashree Pandian Duraipandian, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 666 days.

(21) Appl. No.: 17/880,865

(22) Filed: Aug. 4, 2022

(65) Prior Publication Data
US 2023/0297354 A1    Sep. 21, 2023

(30) Foreign Application Priority Data
Jan. 24, 2022   (IN) .............................. 202241003907

(51) Int. Cl.
*G06F 9/44* (2018.01)
*G06F 8/51* (2018.01)
(Continued)

(52) U.S. Cl.
CPC .................. *G06F 8/51* (2013.01); *G06F 8/71* (2013.01); *G06N 20/00* (2019.01)

(58) Field of Classification Search
CPC ....................................................... G06F 8/51
(Continued)

(56) References Cited

U.S. PATENT DOCUMENTS 9,569,246 B2   2/2017   Roehrig
9,600,299 B2   3/2017   Klemenz et al.
(Continued)

FOREIGN PATENT DOCUMENTS

AU    2017258180 B2   11/2017
WO    WO-2008152515 A2 * 12/2008 ............... G06F 8/51

OTHER PUBLICATIONS

Dumindu De Silva "Migrate from .NET Framework to .NET 5 or later", Jul. 25, 2021, pp. 1-21, [online][retrieved on May 9, 2025]. Retrieved from <https://medium.com/@dumindudesilva/migrate-from-the-net-framework-to-net-5-5aef306d10f5> (Year: 2021).*

*Primary Examiner* — Evral E Bodden
(74) *Attorney, Agent, or Firm* — CANTOR COLBURN LLP

(57) ABSTRACT

The present invention provides for transforming .NET framework based legacy applications latest .NET framework versions. In operation, the present invention provides for retrieving source code of application to be transformed. Further, metadata object is extracted from retrieved source code. The metadata object comprises details, including, application type, .NET framework version of application, and features of application that are incompatible with selected modern-framework, such as .NET Core, .NET 5.0, .NET 6.0 or any other latest .NET framework version to which application is to be transformed. Further, a step list is generated based on the metadata object. The step list is representative of list of steps to be executed to transform the features of the application that are incompatible with the selected modern-framework to modern-framework compatible features. Yet further, present the invention provides for transforming .NET framework based application to selected modern-framework based application based on metadata object and generated step list.

24 Claims, 4 Drawing Sheets

(51) Int. Cl.
*G06F 8/71* (2018.01)
*G06N 20/00* (2019.01)

(58) Field of Classification Search
USPC .......................................................... 717/137
See application file for complete search history.

(56) References Cited

U.S. PATENT DOCUMENTS

| | | | |
|---|---|---|---|
| 9,665,601 B1* | 5/2017 | Hillyard | ................ G06F 16/211 |
| 10,223,097 B2 | 3/2019 | Weber | |
| 2006/0143597 A1 | 6/2006 | Alaluf et al. | |
| 2010/0138534 A1* | 6/2010 | Mutnuru | ............. H04L 43/0817 |
| | | | 709/224 |
| 2015/0143546 A1* | 5/2015 | Bradley | .............. G06F 21/6218 |
| | | | 726/30 |
| 2018/0343300 A1 | 11/2018 | Halter | |
| 2020/0225915 A1 | 7/2020 | Wong et al. | |

* cited by examiner

SYSTEM AND METHOD FOR TRANSFORMING .NET FRAMEWORK BASED APPLICATIONS TO MODERN FRAMEWORKS

CROSS REFERENCE TO RELATED APPLICATION

This application is related to and claims the benefit of Indian Patent Application number 202241003907 filed on Jan. 24, 2022, the contents of which are herein incorporated by reference in their entirety.

FIELD OF THE INVENTION

The present invention relates generally to the field of software frameworks. More particularly, the present invention relates to a system and a method for transforming Legacy Applications built using Network Enabled Technology (.NET) framework to modern frameworks, such as .NET Core, .NET 5.0, and .NET 6.0, whereby the transformed applications can be easily deployed onto any cloud environment.

BACKGROUND OF THE INVENTION

A software framework is a platform that provides an environment, whereby common code with generic functionality can be selectively overridden by additional user-written code to provide an application-specific code that performs a specialized functionality. One such software framework is the Microsoft's .NET framework. Although, the .NET framework provides users with features such as code reuse, code specialization, resource management, multi-language development, security, deployment and administration, the applications built using the .NET framework, referred to as .NET legacy applications can b run mostly on Windows Operating Systems (OS). However, with advancement of technology cloud computing has become a new norm, and setting up Windows Operating System (OS) on a cloud to deploy .NET legacy applications is costlier compared to setting up other non-windows operating systems.

In order to address the above-mentioned issue, .NET Core which is a cross-platform framework was developed by Microsoft. The applications built using the .NET Core framework can be deployed on windows OS, as well as other non-windows operating systems, such as, but not limited to, Linux and Ubuntu, the setup cost of which is lower on cloud. However, the issue of transforming the existing .NET applications remains. As many organizations are opting for cloud, therefore, the existing .NET legacy applications of said organizations need to transformed into .NET Core applications or other modern-framework application for migration to Cloud Environment as Cloud Native.

At present, the tools available for transforming .NET applications to .NET Core applications work with windows OS only. Further, the existing tools transform same set of parameters for different application types such as, but not limited to, Windows Presentation Foundation (WPF), Active Server Pages Network Enabled Technology (ASP) .NET Model View Controller (MVC) apps, Windows Forms, Console and Class libraries, making the transformation of .NET to .NET Core inaccurate as different application types require different parameters. Furthermore, the existing tools require installation of one or more supporting tools, making the transformation tedious and time consuming.

In light of the above drawbacks, there is a need for a system and a method that can readily transform applications built using .NET framework to modern-frameworks, such as, but not limited to .NET Core, .NET 5.0, .NET 6.0 etc. There is a need for a system and a method which can work with windows OS, as well as, non-windows OS, such as, Linux and Ubuntu. Further, there is a need for a system and a method that can assess multiple application types. Furthermore, there is a need for a system and a method that can accurately transform applications built using multiple obsolete versions of .NET framework to modern-frameworks, such as .NET core in a short duration of time. Yet further, there is a need for a system and a method that can automatically transform .NET based application to .NET Core application or any other latest .NET framework or modern-framework based application, thereby eliminating the need of a user to have any technical expertise related to framework transformations. Yet further, there is a need for a system and a method that minimizes manual intervention. Yet further, there is a need for a system which is secure and economical.

SUMMARY OF THE INVENTION

In accordance with various embodiments of the present invention, a method for transforming a .NET application to a modern-framework based application is provided. The method is implemented by a processor executing program instructions stored in a memory. The method comprises extracting a metadata object from a source code of the .NET application. The metadata object comprises details associated with the .NET application. The method further comprises generating a step list based on the metadata object using a predefined mapping table or machine learning or a combination thereof. The step list is representative of a list of steps to be executed to transform the .NET application to the modern-framework based application. Further, the method comprises transforming the .NET application to the modern-framework based application by executing the list of steps associated with the generated step list.

In accordance with various embodiments of the present invention, a system for transforming a .NET application to a modern-framework based application is provided. The system comprises a memory storing program instructions, a processor configured to execute program instructions stored in the memory, and d a transformation engine executed by the processor, and configured to extract a metadata object from a source code of the .NET application. The metadata object comprises details associated with the .NET application. Further, the system is configured to generate a step list based on the metadata object using a predefined mapping table or machine learning or a combination thereof. The step list is representative of a list of steps to be executed to transform the .NET application to the modern-framework based application. Yet further, the system is configured to transform the .NET application to the modern-framework based application by executing the list of steps associated with the generated step list.

In accordance with various embodiments of the present invention, a computer program product is provided. The computer program product comprises a non-transitory computer-readable medium having computer-readable program code stored thereon, the computer-readable program code comprising instructions that, when executed by a processor, cause the processor to extract a metadata object from a source code of the .NET application. The metadata object comprises details associated with the .NET application. The details associated with the .NET application include application type, .NET framework version, and features of the .NET application that are incompatible with the modern-framework. Further, a step list is generated based on the metadata object using a predefined mapping table or machine learning or a combination thereof. The step list is representative of a list of steps to be executed to transform the .NET application to the modern-framework based application. Yet further, the .NET application is transformed to the modern-framework based application by executing the list of steps associated with the generated step list using predefined transformation rules or machine learning or a combination thereof.

BRIEF DESCRIPTION OF THE
ACCOMPANYING DRAWINGS

The present invention is described by way of embodiments illustrated in the accompanying drawings wherein.

Figure 1:
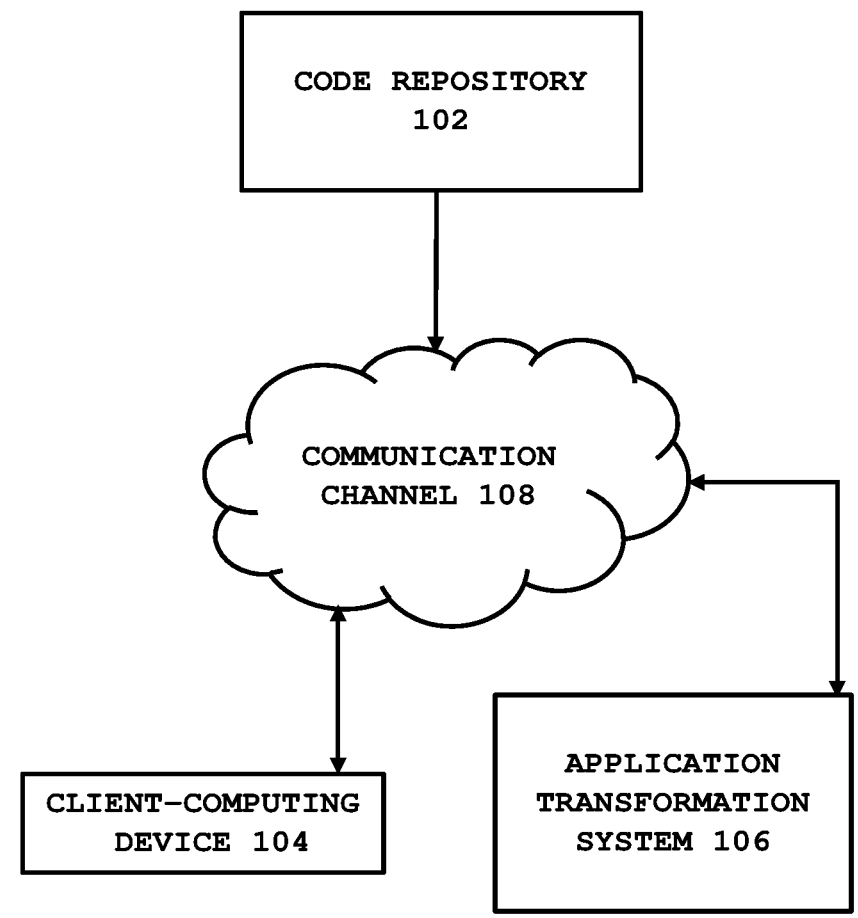
FIG. 1 is a block diagram of a computing environment including a system for transforming .NET framework based application to modern-framework based application, in accordance with various embodiments of the present invention.

DETAILED DESCRIPTION OF THE
INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "legacy applications" as used in the specification refers to obsolete applications built using the .NET framework versions ranging from .NET 1.0 to .NET 4.7. The phrase ".NET framework based application" and ".NET applications have been used interchangeably". The phrase "latest .NET framework based application" and "modern-framework based applications have been used interchangeably".

The present invention discloses a system and a method for transforming .NET framework based legacy applications to latest .NET framework/modern-framework based applications. In particular, the present invention, discloses a system and a method that readily transforms applications based on .NET framework versions ranging from 1.0-4.7 to latest .NET framework/modern-framework versions, including, but not limited to, .NET Core, .NET 5.0, .NET 6.0 etc., further facilitating cloud migration. In operation, the present invention for provides retrieving source code of the application to be transformed. The present invention further provides for extracting metadata object from the retrieved source code. The metadata object comprises details, including, but not limited to, application type, such as, WebAPI, MVC, etc., .NET framework version of the application, and features of the application that are incompatible with a selected modern-framework to which the application is to be transformed, such as .NET Core, .NET 5.0, .NET 6.0 or any other latest .NET framework version. Further, the present invention provides for generating a step list based on the metadata object, wherein the step list is representative of a list of steps to be executed to transform the features of the application that are incompatible with the selected latest/modern-framework, such as .NET Core framework to latest/modern-framework compatible features. Furthermore, the present invention, provides for generating a transformation assessment report based on the generated step list and metadata object, wherein the transformation assessment report comprises at least the application type, features of the application incompatible with the selected modern-framework, such as .NET Core and the steps that are to be executed to transform the incompatible features to selected modern-framework compatible features, such as .NET core compatible features. Yet further, the present invention provides for transforming .NET framework based application to the selected modern-framework based application based on the metadata object and the generated step list, wherein the retrieved source code of the .NET framework based application is transformed to the selected modern-framework using predefined transformation rules or machine learning techniques or a combination thereof.

The present invention would now be discussed in context of embodiments as illustrated in the accompanying drawings.

Referring to FIG. 1, a block diagram of a computing environment including a system for transforming .NET framework based application to modern-framework based application is illustrated. In an embodiment of the present invention the computing environment 100 includes a code repository 102, a client-computing device 104 and a system for transforming .NET framework based application to modern-framework based application, hereinafter referred to as application transformation system 106.

In accordance with various embodiments of the present invention, the code repository 102 may be any platform which provides resources for storing, and managing source codes. In accordance with various embodiments of the present invention, the code repository 102 may be a general purpose computer such as a desktop, a laptop, and a server computer; a super computer; a microcomputer; a virtual computer or any other device capable of executing instructions, connecting to a network, providing resources for building, sharing, managing and hosting software applications, and sending/receiving data. In an embodiment of the present invention, the code repository 102 may be selected from a Github platform, a Team Foundation Server (TFS) repository or Visual source safe and the like. In an embodiment of the present invention, the code repository 102 interfaces with the application transformation system 106 via a communication channel 108. Examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In accordance with various embodiments of the present invention, the client-computing device 104 may be a general purpose computer, such as a desktop, a laptop, a smartphone and a tablet; a super computer; a microcomputer or any device capable of executing instructions, connecting to a network and sending/receiving data. In an embodiment of the present invention, the client computing device 104 interfaces with application transformation system 106 via the communication channel 108. In an embodiment of the present invention, a user module of the application transformation system 106 may be installed onto the client-computing device 104 to access the application transformation system 106 via the communication channel 108.

Figure 1A:
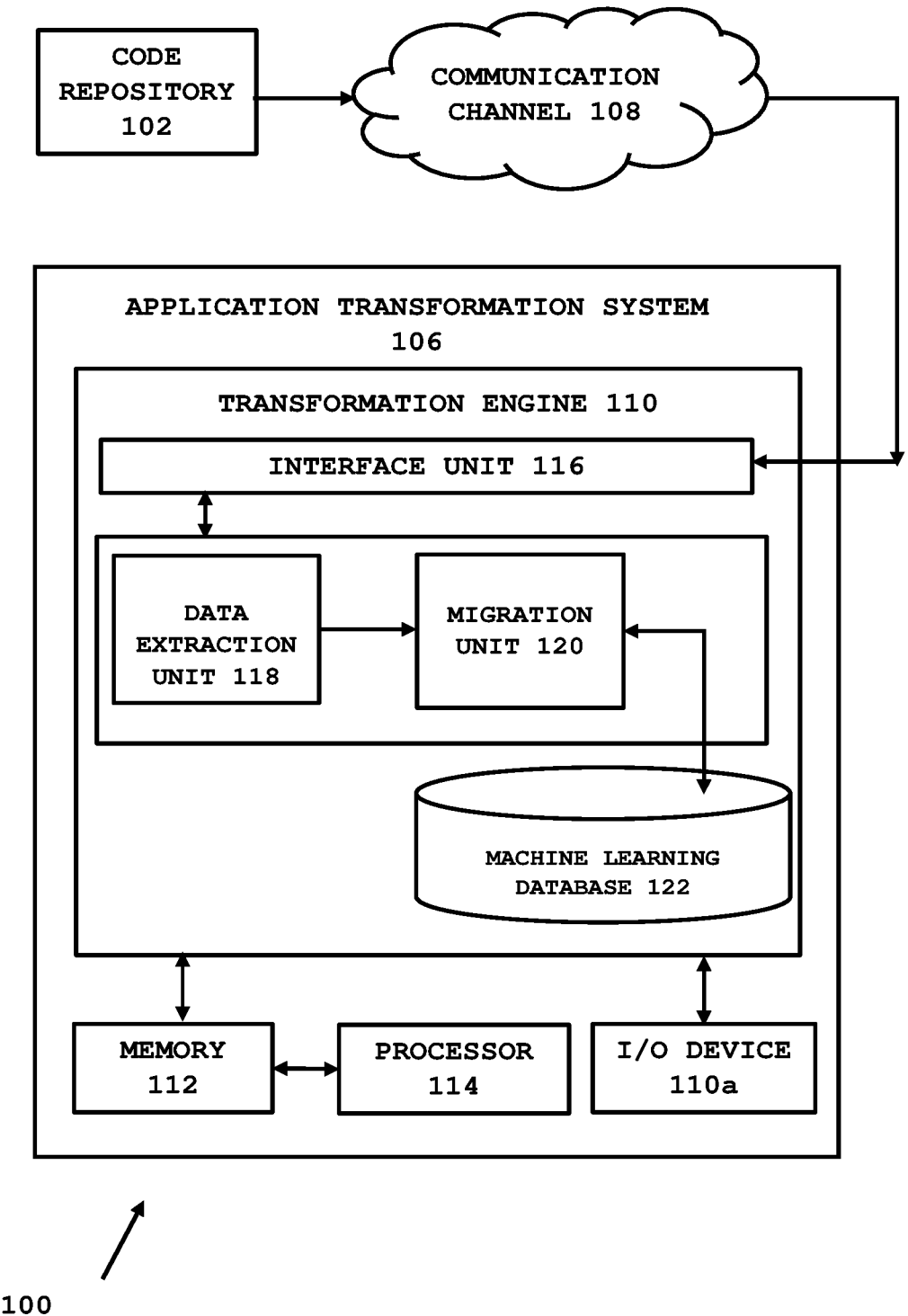
FIG. 1A illustrates a detailed block diagram of a system for transforming .NET framework based application to modern-framework based application, in accordance with various embodiments of the present invention.

In accordance with various embodiments of the present invention, the application transformation system 106 may be a software executable by any computing device or a combination of software and hardware. In an embodiment of the present invention as shown in FIG. 1 and FIG. 1A, the application transformation system 106 is a combination of software and hardware. In an embodiment of the present invention, the application transformation system 106 may be implemented using a client-server architecture, wherein the client-computing device 104 or any other computing device (not shown) accesses a server hosting the application transformation system 106 via the communication channel 108. In another embodiment of the present invention, the application transformation system 106 may be implemented in a cloud computing architecture in which data, applications, services, and other resources are stored and delivered through shared data-centers. In an exemplary embodiment of the present invention, the functionalities of the application transformation system 106 are delivered as Software as a Service (SAAS) to one or more client-computing devices 104. In an exemplary embodiment of the present invention, the application transformation system 106 is a remote resource implemented over the cloud and accessible for shared usage in a distributed computing architecture by multiple client-computing devices 104. In an exemplary embodiment of the present invention, the application transformation system 106 may be accessed via an Internet Protocol (IP) address/domain name. In another exemplary embodiment of the present invention, the application transformation system 106 may be accessed via a user module of the application transformation system 106 executable on the client-computing device 104.

In another embodiment of the present invention, the application transformation system 106 is a software installable and executable on the client-computing device 104. In an embodiment of the present invention, the client computing-device 104 is configured with a Graphical User Interface (GUI) of the application transformation system 106 to at least provide inputs, upload source code of the application to b transformed, receive application transformation reports and transformed source code among other things.

In accordance with various embodiments of the present invention, the application transformation system 106 is configured to interface with the code repository 102, and the client computing device 104. In an embodiment of the present invention, the application transformation system 106 is configured to interface with the code repository 102 to be retrieve source code of the .NET application to transformed. In an embodiment of the present invention, the application transformation system 106 is configured to interface with the client-computing device 104 to receive address of the code repository 102 to further retrieve the source code of the .NET application to be transformed and output the transformed code. In another embodiment of the present invention, the application transformation system 106 is configured to interface with the client-computing device 104 and/or any external resource (not shown) such as a storage to receive the source code of the .NET application to be transformed and output the transformed code.

Referring to FIG. 1A a detailed block diagram of a system for transforming .NET framework based application to modern-framework based application is illustrated. In an embodiment of the present invention, the application transformation system 106 comprises a transformation engine 110, an Input/Output (I/O) device 110a, a memory 112, and a processor 114. The transformation engine 110 is operated via the processor 114 specifically programmed to execute instructions stored in the memory 112 for executing functionalities of the transformation engine 110. In accordance with various embodiments of the present invention, the memory 112 may be a Random Access Memory (RAM), a Read-only memory (ROM), a hard drive disk (HDD) or any other memory capable of storing data and instructions.

In accordance with various embodiments of the present invention, the transformation engine 110 is a self-learning engine configured to retrieve complex source code data, analyze said source code to extract metadata, generate step list, transform source code to modern-framework based source code using extracted metadata and step list, and generate transformation report.

In accordance with various embodiments of the present invention, the transformation engine 110 comprises an interface unit 116, a data extraction unit 118, a migration unit 120 and a Machine Learning (ML) database 122. The various units of the transformation engine 110 are operated via the processor 114 specifically programmed to execute instructions stored in memory for the 112 executing respective functionalities of the multiple units (116, 118 120, and 122) in accordance with various embodiments of the present invention.

In accordance with various embodiments of the present invention, the interface unit 116 is configured to facilitate communication with the code repository 102, the client-computing device 104, and any other external resource (not shown). Examples of external resource may include, but are not limited to, storage devices, and third party systems such as computing resources, databases etc. In an embodiment of the present invention, the interface unit 116 is configured to provide communication with the I/O device 110a associated with the application transformation system 106 for updating system configurations and receiving inputs from the system admins.

In an embodiment of the present invention, the interface unit 116 is configured with a web gateway, a mobile gateway, a Graphical User Interface (GUI), an integration interface, and a configuration interface to facilitate interfacing with the code repository 102, the client-computing device 104, the I/O device 110a and other external resource (not shown). In an exemplary embodiment of the present invention, the integration interface is configured with one or more Application Programming Interfaces (APIs), such as Representational State Transfer (REST) and Simple Object Access Protocol (SOAP) APIs t facilitate smooth interfacing and/or integration with the code repository 102, and the client-computing device 104. In an embodiment of the present invention, the configuration interface provides communication with the Input/output device 110a for receiving, updating and modifying administration configurations from system admins, and receiving other data.

In an embodiment of the present invention, the GUI is accessible on the client-computing device 104 to facilitate user interaction. In an exemplary embodiment of the present invention, the Graphical User Interface (GUI) allows a user to at least: create login credentials, sign-in using the login credentials, upload application source code, input code repository address, receive transformation assessment reports, and receive transformed source code amongst other things. In an embodiment of the present invention, the graphical user interface (GUI) may be accessed from the client-computing device 104 through a web gateway. In another embodiment of the present invention, the GUI may be accessed by mobile gateway using a user module installable on the client-computing device 104. In an embodiment of the invention, where the application transformation system 106 is a software installable and executable on the client-computing device 104, the GUI along with other units are locally accessible on the client-computing device 104 via the configuration interface of the interface unit 116.

In accordance with various embodiments of the present invention, the data extraction unit 118 is configured to retrieve source code of the .NET application to be transformed via the interface unit 116. In an embodiment of the present invention, the data extraction unit 118 is configured to retrieve the source code of the .NET application to be transformed from the code repository 102 via the interface unit 116. In an embodiment of the present invention, the address of the code repository 102 for retrieving the application source code is received from a user via the I/O device 110a and/or the client-computing device 104, and subsequently, the application source code is retrieved by accessing the code repository. In an exemplary embodiment of the present invention, where the code repository 102 is a GitHub platform, a GitHub path and an access token is received as an input to retrieve the source code. In another exemplary embodiment of the present invention, where the code repository 102 is a TFS, Visual safe and the like, a Uniform Resource Locator (URL) address and an access token associated with the code repository 102 is received as an input to retrieve the source code. In another embodiment of the present invention, the source code of the .NET application to be transformed is uploaded by a user via the client-computing device 104 and/or the I/O device 110a. In an embodiment of the present invention, the uploaded source code is in a compressed zip format.

In accordance with various embodiments of the present invention, the data extraction unit 118 is configured to extract metadata object from the retrieved source code. In an embodiment of the present invention, the metadata object comprises details associated with the .NET application. The details associated with the .NET application include, but not limited to, application type, .NET framework version of the application, and features of the .NET application that are incompatible with the selected modern-framework. In an exemplary embodiment of the present invention, the modern framework is selected from .NET Core framework, .NET 5.0, .NET 6.0 or any other latest .NET framework version. Examples of application type include, but are not limited to, ASP .NET, Web API, Class Libraries, Console, Windows Presentation Foundation (WPF), Windows Communication Foundation (WCF), Model View Controller (MVC), Website, Windows Forms, and Entity Framework (EF) version 6. Examples of .NET application framework versions include, but are not limited to .Net version 1.0, 2.0, 3.0 . . . 4.7. Examples of features associated with the .NET application include, but are not limited to, Hypertext Transfer Protocol (HTTP) Context, Entity Frameworks, Cookies, Views, Config related, System.Web, Application (APP) setting, Dependency etc.

In operation, the retrieved .NET application source code is analyzed using one or more data analysis techniques to extract data, such as application type, framework version and features of the .NET application that are incompatible with the selected modern-framework. In an exemplary embodiment of the present invention, the one or more data analysis techniques are based on regular expression (regex) rules. In an exemplary embodiment of the present invention, the regular expression rules are categorized into application type identification regex rules, framework version identification regex rules and incompatible feature identification regex rules. In an exemplary embodiment of the present invention, the regular expression rules are categorized into application type identification regex rules, framework version identification regex rules and incompatible feature identification regex rules. In an exemplary embodiment of the present invention, each category of regex rules is configured to identify one or more predefined patterns as a part of the content of files of the source code to identify the application type, the framework version and the features of the application that are incompatible with the selected modern-framework. Further, the extracted data is converted to metadata object.

In accordance with various embodiments of the present invention, the migration unit 120 is configured to receive the extracted metadata object and the retrieved source code from the data extraction unit 118. In accordance with various embodiments of the present invention, the migration unit 120 is configured to generate a step list based on the metadata object. In an embodiment of the present invention, the migration unit 120 is configured to generate the step list based on the metadata object using a predefined mapping table or machine learning or a combination thereof. In operation, in an embodiment of the present invention, the step list is generated based on the metadata object using the predefined mapping table comprising the application type, the framework version, and features of the .NET application that are incompatible with the selected modern-framework mapped with their corresponding transformation steps. In an embodiment of the present invention, the step list is representative of a list of steps to be executed to transform the .NET application to the modern-framework based application. In an embodiment of the present invention, the step list comprises a reference to pieces of source code facilitating the features of the .NET application that are incompatible with the selected modern-framework, and list of transformations to be made in the pieces of the source code to make the features of the .NET application that are incompatible with the selected modern-framework into modern-framework compatible features. For example, if the selected modern framework is .NET Core, and the features of the .NET application that are with incompatible the .NET Core framework are HTTP Context, APP setting, Dependency etc., then the step list is representative of a list of steps to be executed to transform the pieces of the source code facilitating the features HTTP Context, APP setting, Dependency etc. that are incompatible with .NET core framework to .NET core compatible features.

In an embodiment of the present invention, the migration unit 120 is configured to generate the step list based on the metadata object using machine learning. In an embodiment the step list is generated using machine learning if the predefined mapping table does not include transformation steps corresponding to the application type, the framework version, and features of the .NET application that are incompatible with the selected modern-framework. In an embodiment of the present invention, the step list is generated based on the metadata object using one or more machine learning models maintained in a machine learning database 122. In an embodiment of the present invention, the machine learning database 122 is an Resource Query Language (RQL) database. In accordance with various embodiments of the present invention, the machine learning database 122 is configured to upgrade itself by constantly learning source code transformation from various public source code repositories.

In accordance with various embodiments of the present invention, the migration unit 120 is configured to transform .NET framework based application to the selected modern-framework based application based on the generated step list. In an embodiment of the present invention, the retrieved source code of the .NET framework based application is transformed to the selected modern-framework by executing the step list using a predefined transformation rules or machine learning technique or a combination thereof. In an exemplary embodiment of present the invention, the predefined transformation rules are configured to execute the list of steps associated with the step list using Roslyn parser API and Factory architectural design pattern, whereby the pieces of the source code facilitating the features of the .NET application that are incompatible with the selected modern-framework are fixed in accordance with the selected modern-framework to make the features compatible with the modern-framework.

In an embodiment of the present invention, the migration unit 120 is configured to transform the retrieved source code of the .NET framework based application to the selected modern-framework by executing the step list using machine learning. For example: if the selected modern-framework is .NET core, then the retrieved source code of .NET application is transformed into .NET Core based source code by executing the generated step list using machine learning. In an embodiment of the present invention, the retrieved source code of .NET application is transformed into modern-framework based source code using one or more machine learning models maintained in the machine learning database 122.

In accordance with various embodiments of the present invention, the migration unit 120 is further configured to generate a transformation assessment report based on the generated step list, metadata object and transformed code. In an embodiment of the present invention, the transformation assessment report comprises at least the application type, features of the application that are incompatible with the selected modern-framework, the steps that are to be executed to transform the incompatible features to selected modern-framework compatible features, the incompatible features that have been successfully transformed along with file name of the source code, line number of the source code which has been fixed to cause the feature transformation and description of the feature transformation, list of incompatible features that are difficult to transform, and detailed recommendations to fix pieces of source code facilitating incompatible features that are difficult to transform. In an embodiment of the present invention, the transformation assessment report is in Hyper Text Markup Language (HTML) format. In an exemplary embodiment of the present invention, the transformation assessment report is transmitted to the client-computing device 104 via the interface unit 116.

Advantageously, the system of the present invention, readily transforms applications built using .NET framework to latest/modern-framework, such as .NET Core, .NET 5.0, .NET 6.0 etc. based applications. Further, the system of the present invention works with windows OS, as well as, non-windows OS, such as, Linux and Ubuntu. Furthermore, the system of the present provides invention automated transformation of .NET based application to .NET Core, .NET 5.0, .NET 6.0 based application using predefined transformation rules or machine learning, thereby eliminating the need of a user to have any technical expertise related to framework transformations. Yet further, the system of the present invention facilitates migration of .NET based application to cloud by providing automated transformation to modern-framework.

Figure 2:
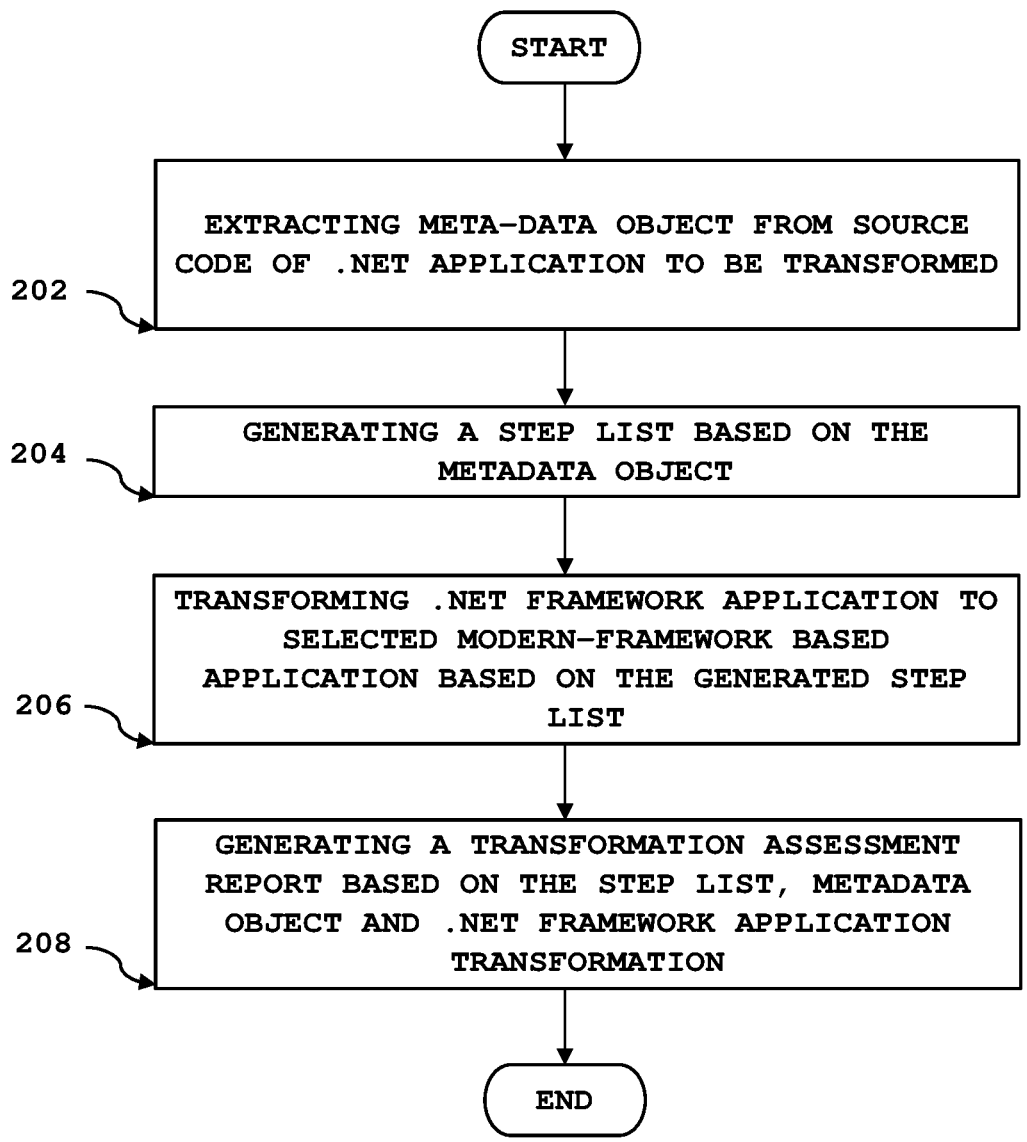
FIG. 2 is a flowchart illustrating a method for transforming .NET framework based application to modern-framework based application, in accordance with various embodiments of the present invention.

Referring to FIG. 2, a flowchart of a method for transforming .NET framework based application to modern-framework based application is shown, in accordance with various embodiments of the present invention.

At step 202, metadata object is extracted from source code of .NET application to be transformed. In an operation, in an embodiment of the present invention, the source code of the .NET application to be transformed is retrieved. In an embodiment of the present invention, the source code of the .NET application to be transformed is retrieved from a code repository (102 of FIG. 1). In an embodiment of the present invention, the address of the code repository for retrieving the application source code is received from a user, and subsequently, the application source code is retrieved. In an exemplary embodiment t of the present invention, where the code repository is a GitHub platform, a GitHub path and an access token is received as an input to retrieve the source code. In another exemplary embodiment of the present invention, where the code repository is a TFS, Visual safe and the like, a URL address and an access token associated with the code repository is received as an input to retrieve the source code. In another embodiment of the present invention, the source code of the .NET application to be transformed is uploaded by a user via a client-computing device (104 of FIG. 1). In an exemplary embodiment of the present invention, the uploaded source code is in a compressed zip format.

Further, the metadata object is extracted from the retrieved source code. In an embodiment of the present invention, the metadata object comprises details associated with the .NET application. The details associated with the .NET application include, but not limited to, application type, .NET framework version of the application, and features of the application that are incompatible with the selected modern-framework. Examples of application type include, but are not limited to, ASP .NET, Web API, Class Libraries, Console, Windows Presentation Foundation (WPF), Windows Communication Foundation (WCF), Model View Controller (MVC), Website, Windows Forms, and Entity Framework version 6 (EF 6.0). Examples of .NET application framework versions include, but are not limited to .Net version 1.0, 2.0, 3.0 . . . 4.7. Examples of features associated with the .NET application include, but are not limited to, HTTP Context, Entity Frameworks, Cookies, Views, Config related, System. Web, APP setting, Dependency etc.

In operation, the retrieved .NET application source code is analyzed using one or more data analysis techniques to extract data, such as application type, framework version and features of the .NET application that are incompatible with the selected modern framework. In an exemplary embodiment of the present invention, the one or more data analysis techniques are based on regular expression (regex) rules. In an exemplary embodiment of the present invention, the regular expression rules are categorized into application type identification regex rules, framework version identification regex rules and incompatible feature identification regex rules. In an exemplary embodiment of the present invention, each category of regex rules is configured to identify one or more predefined patterns as a part of the content of files of the source code to identify the application type, the framework version and the features of the application that are incompatible with the selected modern-framework. Further, the extracted data is converted to metadata object.

At step 204, a step list is generated based on the metadata object. In an embodiment of the present invention, the step list is generated based on the metadata object using a predefined mapping table or machine learning or a combination thereof. In operation, in an embodiment of the present invention, the step list is generated based on the metadata object using the predefined mapping table comprising the application type, the framework version, and features of the .NET application that are incompatible with the selected modern-framework mapped with their corresponding transformation steps. In an embodiment of the present invention, the step list is representative of a list of steps to be executed to transform the .NET application to the modern-framework based application. In an embodiment of the present invention, the step list comprises a reference to pieces of source code facilitating the features of the .NET application that are incompatible with the selected modern-framework, and list of transformations to be made in the pieces of the source code to make the features of the .NET application that are incompatible with the selected modern-framework into modern-framework compatible features. For example, if the selected modern framework is .NET Core, and the features of the .NET application that are incompatible with the .NET Core framework are HTTP Context, APP setting, Dependency etc., then the step list is representative of a list of steps to be executed to transform the pieces of the source code facilitating the features HTTP Context, APP setting, Dependency etc. that are incompatible with .NET core framework to .NET core compatible features.

In an embodiment of the present invention, the step list is generated based on the metadata object using machine learning. In an embodiment the step list is generated using machine learning if the predefined mapping table does not include transformation steps corresponding to the application type, the framework version, and features of the .NET application that are incompatible with the selected modern-framework. In an embodiment of the present invention, the step list is generated based on the metadata object using one or more machine learning models maintained in a machine learning database. In accordance with various embodiments of the present invention, the machine learning database is configured to upgrade itself by constantly learning source code transformation from various public source code repositories.

At step 206, .NET framework application is transformed to selected modern-framework based application based on the generated step list. In an embodiment of the present invention, the retrieved source code of the .NET framework based application is transformed to the selected modern-framework by executing the step list using a predefined transformation rules or machine learning technique or combination thereof. In an exemplary embodiment of the present invention, the predefined transformation rules are configured to execute the list of steps associated with the step list using Roslyn parser API and Factory architectural design pattern, whereby the pieces of the source code facilitating the features of the .NET application that are incompatible with the selected modern-framework are fixed in accordance with the selected modern-framework to make the features compatible with the modern-framework.

In an embodiment of the present invention, the retrieved source code of the .NET framework based application is transformed to the selected modern-framework by executing the step list using machine learning. For example: if the selected modern-framework is .NET core, then the retrieved source code of .NET application is transformed into .NET Core based source code by executing the generated step list using machine learning. In an embodiment of the present invention, the retrieved source code of .NET application is transformed into modern-framework based source code using one or more machine learning models maintained in the machine learning database.

At step 208, a transformation assessment report is generated based on the generated step list, the metadata object, and .NET framework based application transformation. In an embodiment of the present invention, the transformation assessment report comprises at least the application type, features of the application that are incompatible with the selected modern-framework, the steps that are to be executed to transform the incompatible features to selected modern-framework compatible features, the incompatible features that have been successfully transformed along with file name of the source code, line number of the source code which has been fixed to cause the feature transformation and description of the feature transformation, list of incompatible features that are difficult to transform, and detailed recommendations to fix pieces of source code facilitating incompatible features that are difficult to transform. In an embodiment of the present invention, the transformation assessment report is in HTML (HyperText Markup Language) format. In an exemplary embodiment of the present invention, the transformation assessment report is transmitted to the client-computing device (104 of FIG. 1).

Advantageously, the method of the present invention, readily transforms applications built using .NET framework to modern .NET Core applications. Further, the method of the present invention works with windows OS, as well as, non-windows OS, such as, Linux and Ubuntu. Furthermore, the method of the present invention provides automated transformation of .NET based application to .NET Core, .NET 5.0, .NET 6.0 based application using predefined transformation rules or machine learning, thereby eliminating the need of a user to have any technical expertise related to framework transformations. Yet further, the method of the present invention facilitates migration of .NET based application to cloud by providing automated transformation to modern-framework.

Figure 3:
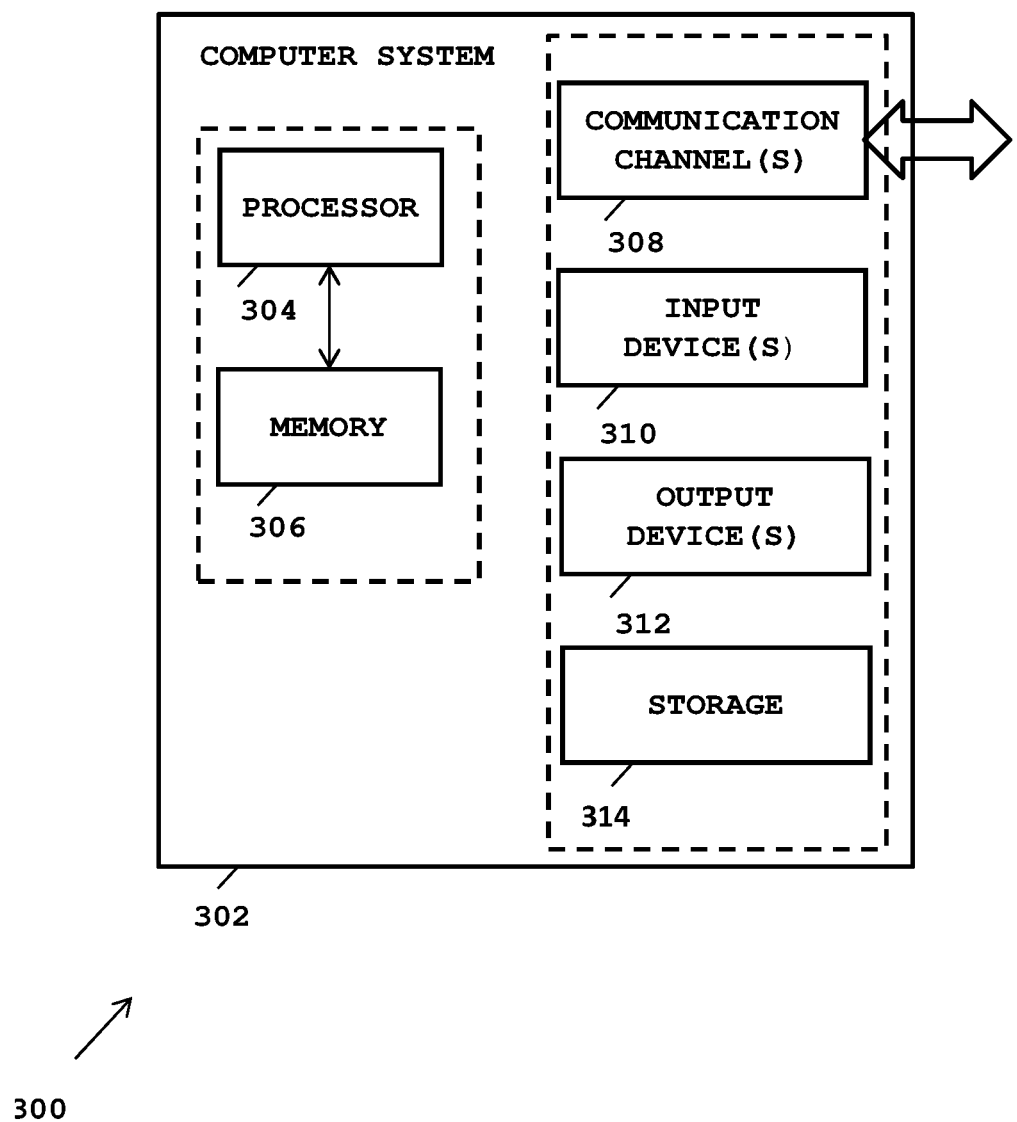
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, Radio Frequency (RF), infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on Cathode Ray Tube (CRT) or Liquid Crystal Display (LCD), printer, speaker, Compact Disk/Digital Versatile Disk (CD/DVD) writer, or any other device that provides output from the computer system 302.

The storage 314 may include, but not limited to, magnetic disks, magnetic tapes, Compact Disc-Read Only Memory (CD-ROMS), Compact Disk Rewritable (CD-RWs), Digital Versatile Disc (DVDs), flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, Read Only Memory (ROM), flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for transforming a Network Enabled Technology (.NET) application to a modern-framework based application, wherein the method is implemented by a processor executing program instructions stored in a memory, the method comprising:

extracting, by the processor, a metadata object from a source code of the .NET application, wherein the metadata object comprises details associated with the .NET application;

generating, by the processor, a step list based on the metadata object using a predefined mapping table or machine learning or a combination thereof, wherein the step list is representative of a list of steps to be executed to transform the .NET application to the modern-framework based application, wherein the step list comprises a reference to pieces of the source code facilitating features of the .NET application that are incompatible with the modern-framework, and a list of transformations to be made in the pieces of the source code to make the features of the .NET application that are incompatible with the modern-framework into modern-framework compatible features; and transforming, by the processor, the .NET application to the modern-framework based application by executing the list of steps associated with the generated step list.

2. The method as claimed in claim 1, wherein the modern-framework is selected from .NET Core, .NET 5.0 and .NET 6.0.

3. The method as claimed in claim 1, wherein the source code of the .NET application is retrieved from a code repository using an address and an access token of the code repository.

4. The method as claimed in claim 1, wherein the details associated with the .NET application include application type, .NET framework version, and features of the .NET application that are incompatible with the modern-framework.

5. The method as claimed in claim 4, wherein the application type is selected from Active Server Pages Network Enabled Technology (ASP.NET), Web Application Programming Interface (API), Class Libraries, console, Windows Presentation Foundation (WPF), Windows Communication Foundation (WCF), Model View Controller (MVC), Website, Windows Forms, and Entity Framework (EF) version 6.

6. The method as claimed in claim 1, wherein extracting the metadata object from the source code of the .NET application comprises: analyzing the source code using one or more data analysis techniques to extract data comprising an application type, a .NET framework version and features of the .NET application that are incompatible with the modern-framework; and converting the extracted data to metadata object.

7. The method as claimed in claim 6, wherein the one or more data analysis techniques are based on Regular Expression (regex) rules categorized into application type identification regex rules, framework version identification regex rules and incompatible feature identification regex rules, wherein each category of regex rules is configured to identify one or more predefined patterns as a part of the source code to identify the application type, the framework version and the features of the application that are incompatible with the modern-framework.

8. The method as claimed in claim 1, wherein the predefined mapping table comprises an application type, a framework version, and features of the .NET application that are incompatible with the selected modern-framework mapped with their corresponding transformation steps.

9. The method as claimed in claim 4, wherein the step list is generated based on the metadata object using machine learning if the predefined mapping table does not include transformation steps corresponding to the application type, the framework version, and the features of the .NET application that are incompatible with the modern-framework.

10. The method as claimed in claim 1, wherein the list of steps associated with the generated step list are executed using predefined transformation rules or machine learning or a combination thereof.

11. The method as claimed in claim 10, wherein the predefined transformation rules are configured to execute the list of steps associated with the step list using Roslyn parser Application Programming Interface (API) and factory architectural design pattern, whereby pieces of the source code facilitating features of the .NET application that are incompatible with the selected modern-framework are fixed in accordance with the modern-framework to make the features compatible with the modern-framework.

12. The method as claimed in claim 1, wherein a transformation assessment report is generated and transmitted to a client-computing device, said transformation assessment report is generated based on the step list, the metadata object, and the .NET application transformation, wherein the transformation assessment report comprises at least an application type, features of the application that are incompatible with the selected modern-framework, steps that are to be executed to transform the incompatible features to the modern-framework compatible features, the incompatible features that have been successfully transformed along with file name of the source code, line number of the source code which has been fixed to cause feature transformation, description of the feature transformation, list of incompatible features that are difficult to transform, and detailed recommendations to fix pieces of the source code facilitating incompatible features that are difficult to transform.

13. A system for transforming a Network Enabled Technology (.NET) application to a modern-framework based application, the system comprising:
a memory storing program instructions; a processor configured to execute program instructions stored in the memory; and a transformation engine executed by the processor, and configured to:
extract a metadata object from a source code of the .NET application, wherein the metadata object comprises details associated with the .NET application;
generate a step list based on the metadata object using a predefined mapping table or machine learning or a combination thereof, wherein the step list is representative of a list of steps to be executed to transform the .NET application to the modern-framework based application, wherein the step list comprises a reference to pieces of the source code facilitating features of the .NET application that are incompatible with the modern-framework, and a list of transformations to be made in the pieces of the source code to make the features of the .NET application that are incompatible with the modern-framework into modern-framework compatible features; and
transform the .NET application to the modern-framework based application by executing the list of steps associated with the generated step list.

14. The system as claimed in claim 13, wherein the modern-framework is selected from .NET Core, .NET 5.0 and .NET 6.0.

15. The system as claimed in claim 13, wherein the transformation engine comprises an interface unit executed by the processor, said interface unit configured to provide interfacing with a client-computing device and a code repository to retrieve the source code of the .NET application, wherein retrieving the source code from the code repository comprises: receiving an address and an access token of the code repository, and accessing the code repository.

16. The system as claimed in claim 13, wherein the details associated with the .NET application include application type, .NET framework version, and features of the .NET application that are incompatible with the modern-framework.

17. The system as claimed in claim 13, wherein the transformation engine comprises a data extraction unit executed by the processor, said data extraction unit configured to extract the metadata object from the source code of the .NET application by: analyzing the source code using one or more data analysis techniques to extract data comprising an application type, a .NET framework version and features of the .NET application that are incompatible with the modern-framework; and converting the extracted data to metadata object.

18. The system as claimed in claim 17, wherein the one or more data analysis techniques are based on Regular Expression (regex) rules categorized into application type identification regex rules, framework version identification regex rules and incompatible feature identification regex rules, wherein each category of regex rules is configured to identify one or more predefined patterns as a part of the source code to identify the application type, the framework version and the features of the application that are incompatible with the modern-framework.

19. The system as claimed in claim 13, wherein the predefined mapping table comprises an application type, a framework version, and features of the .NET application that are incompatible with the selected modern-framework mapped with their corresponding transformation steps.

20. The system as claimed in claim 16, wherein the step list is generated based on the metadata object using machine learning if the predefined mapping table does not include transformation steps corresponding to the application type, the framework version, and the features of the .NET application that are incompatible with the modern-framework.

21. The system as claimed in claim 13, wherein the list of steps associated with the generated step list are executed using predefined transformation rules or machine learning or a combination thereof.

22. The system as claimed in claim 21, wherein the predefined transformation rules are configured to execute the list of steps associated with the step list using Roslyn parser Application Programming Interface (API) and factory architectural design pattern, whereby pieces of the source code facilitating features of the .NET application that are incompatible with the selected modern-framework are fixed in accordance with the modern-framework to make the features compatible with the modern-framework.

23. The system as claimed in claim 13, wherein a transformation assessment report is generated and transmitted to a client-computing device, said transformation assessment report is generated based on the step list, the metadata object, and the .NET application transformation, wherein the transformation assessment report comprises at least an application type, features of the application that are incompatible with the selected modern-framework, steps that are to be executed to transform the incompatible features to the modern-framework compatible features, the incompatible features that have been successfully transformed along with file name of the source code, line number of the source code which has been fixed to cause feature transformation, description of the feature transformation, list of incompatible features that are difficult to transform, and detailed recommendations to fix pieces of the source code facilitating incompatible features that are difficult to transform.

24. A computer program product comprising:
a non-transitory computer-readable medium having computer-readable program code stored thereon, the computer-readable program code comprising instructions that, when executed by a processor, cause the processor to:

extract a metadata object from a source code of the Network Enabled Technology (.NET) application, wherein the metadata object comprises details associated with the .NET application, wherein the details associated with the .NET application include application type, .NET framework version, and features of the .NET application that are incompatible with the modern-framework;

generate a step list based on the metadata object using a predefined mapping table or machine learning or a combination thereof, wherein the step list is representative of a list of steps to be executed to transform the .NET application to the modern-framework based application, wherein the step list comprises a reference to pieces of the source code facilitating features of the .NET application that are incompatible with the modern-framework, and a list of transformations to be made in the pieces of the source code to make the features of the .NET application that are incompatible with the modern-framework into modern-framework compatible features; and transform the .NET application to the modern-framework based application by executing the list of steps associated with the generated step list using predefined transformation rules or machine learning or a combination thereof.

* * * * *